(12) United States Patent
Bangerter et al.

(10) Patent No.: US 10,655,855 B2
(45) Date of Patent: May 19, 2020

(54) GAS TURBINE ENGINE WALL ASSEMBLY WITH SUPPORT SHELL CONTOUR REGIONS

(71) Applicant: United Technologies Corporation, Hartford, CT (US)

(72) Inventors: James P. Bangerter, Manchester, CT (US); Kevin J. Low, Portland, CT (US); Russell B. Hanson, Jupiter, FL (US); Nurhak Erbas-Sen, Manchester, CT (US); Frank J. Cunha, Avon, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 949 days.

(21) Appl. No.: 14/910,964

(22) PCT Filed: Aug. 29, 2014

(86) PCT No.: PCT/US2014/053514
§ 371 (c)(1),
(2) Date: Feb. 8, 2016

(87) PCT Pub. No.: WO2015/031816
PCT Pub. Date: Mar. 5, 2015

(65) Prior Publication Data
US 2016/0201909 A1 Jul. 14, 2016

Related U.S. Application Data

(60) Provisional application No. 61/872,343, filed on Aug. 30, 2013.

(51) Int. Cl.
*F23R 3/00* (2006.01)
*F23R 3/60* (2006.01)
(Continued)

(52) U.S. Cl.
CPC ............. *F23R 3/002* (2013.01); *F02C 3/14* (2013.01); *F02C 7/12* (2013.01); *F23R 3/005* (2013.01);
(Continued)

(58) Field of Classification Search
CPC .... F23R 3/002; F23R 3/06; F23R 3/50; F23R 3/60; F23R 2900/03041;
(Continued)

(56) References Cited

U.S. PATENT DOCUMENTS 3,956,886 A 5/1976 Sedgwick
4,077,206 A * 3/1978 Ayyagari ................ F02K 1/386
181/220
(Continued)

FOREIGN PATENT DOCUMENTS

GB 2160964 A 1/1986
GB 2355301 A 4/2001
GB 2356042 A 5/2001

OTHER PUBLICATIONS

EP search report for EP14841046.7 dated Aug. 19, 2016.

*Primary Examiner* — Gerald L Sung
*Assistant Examiner* — Marc J Amar
(74) *Attorney, Agent, or Firm* — Getz Balich LLC

(57) ABSTRACT

A wall assembly for a combustor of a gas turbine engine is provided. The wall assembly includes a support shell with a contoured region to define at least one convergent passage between the support shell and a multiple of liner panels. A method of cooling a wall assembly for a combustor of a gas turbine engine is also provided. This method includes a step of directing cooling air into at least one convergent passage between the support shell and a multiple of liner panels.

20 Claims, 14 Drawing Sheets

(51) Int. Cl.
*F02C 3/14* (2006.01)
*F02C 7/12* (2006.01)
*F23R 3/06* (2006.01)

(52) U.S. Cl.
CPC ............... *F23R 3/06* (2013.01); *F23R 3/60* (2013.01); *F23R 2900/03041* (2013.01); *F23R 2900/03042* (2013.01); *F23R 2900/03043* (2013.01); *F23R 2900/03044* (2013.01); *Y02T 50/675* (2013.01)

(58) Field of Classification Search
CPC .. F23R 2900/03042; F23R 2900/13143; F23R 2900/03044; F23R 2900/03045; F23R 2900/03043; F05D 2260/202; F01D 25/12; F02C 7/20
See application file for complete search history.

(56) References Cited

U.S. PATENT DOCUMENTS

| | | |
|---|---|---|
| 4,628,694 A * | 12/1986 | Kelm .................... B21D 35/00 60/752 |
| 4,805,397 A | 2/1989 | Barbier et al. |
| 5,105,617 A | 4/1992 | Malohn |
| 5,212,942 A | 5/1993 | Malohn |
| 5,331,846 A | 7/1994 | Hurley et al. |
| 5,720,434 A * | 2/1998 | Vdoviak .................... F02K 1/12 239/127.1 |
| 5,779,438 A | 7/1998 | Wilfert |
| 6,217,280 B1 | 4/2001 | Little |
| 7,043,921 B2 | 5/2006 | Hadder |
| 7,093,439 B2 | 8/2006 | Pachero-Tougas et al. |
| 7,493,767 B2 | 2/2009 | Bunker et al. |
| 8,257,809 B2 | 9/2012 | Morrison et al. |
| 8,266,914 B2 | 9/2012 | Hawie et al. |
| 8,359,865 B2 | 1/2013 | Dierberger et al. |
| 8,359,866 B2 | 1/2013 | Dierberger et al. |
| 8,393,155 B2 | 3/2013 | Piper et al. |
| 2002/0162331 A1 | 11/2002 | Coutandin |
| 2003/0213250 A1 | 11/2003 | Pacheco-Tougas et al. |
| 2006/0042257 A1* | 3/2006 | Stastny .................... F23R 3/50 60/772 |
| 2006/0130486 A1 | 6/2006 | Danis et al. |
| 2007/0062198 A1 | 3/2007 | Huth et al. |
| 2008/0264064 A1* | 10/2008 | Sze .................... F23R 3/002 60/752 |
| 2008/0264065 A1* | 10/2008 | Gerendas ............... F23R 3/002 60/754 |
| 2011/0203286 A1 | 8/2011 | Wagner et al. |
| 2012/0255311 A1* | 10/2012 | Miyake .................... F23R 3/005 60/806 |
| 2013/0025287 A1 | 1/2013 | Cunha |
| 2013/0025288 A1 | 1/2013 | Cunha et al. |
| 2014/0360196 A1* | 12/2014 | Graves .................... F23R 3/002 60/753 |
| 2015/0362192 A1 | 12/2015 | Cunha et al. |

* cited by examiner

GAS TURBINE ENGINE WALL ASSEMBLY WITH SUPPORT SHELL CONTOUR REGIONS

CROSS-REFERENCE TO RELATED APPLICATION

This application claims priority to PCT Patent Application No. PCT/US2014/053514 filed Aug. 29, 2014, which claims priority to U.S. Patent Application No. 61/872,343 filed Aug. 30, 2013, which are hereby incorporated by reference in their entireties.

BACKGROUND

The present disclosure relates to a gas turbine engine and, more particularly, to a hot section component therefor.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

Among the engine components, severe temperatures are observed in the combustor section such that cooling is required to meet service life requirements. The combustor section typically includes an outer shell lined with heat shields often referred to as floatwall panels. In certain arrangements, dilution holes in the floatwall panel communicate with respective dilution holes in the outer shell to direct cooling air for dilution of the combustion gases. In addition to the dilution holes, the outer shell may also have relatively smaller air impingement holes to direct cooling air between the floatwall panels and the outer shell to cool the cold side of the floatwall panels. This cooling air exits effusion holes through of the floatwall panels to form a film on a hot side of the floatwall panels as a barrier against the hot combustion gases. With lower emissions requirements and higher combustor temperatures, the amount of cooling air needs to be reduced and the effectiveness thereof needs to be increased.

SUMMARY

A wall assembly within a gas turbine engine, according to one disclosed non-limiting embodiment of the present disclosure, includes a support shell with a contoured region to define at least one convergent passage between the support shell and at least one of a multiple of liner panels.

In a further embodiment of the present disclosure, the multiple of liner panels are forward liner panels within a combustor.

In a further embodiment of any of the foregoing embodiments of the present disclosure, the contoured region is centered with respect to an intermediate circumferential rail of at least one of the multiple of liner panels toward the support shell.

In a further embodiment of any of the foregoing embodiments of the present disclosure, a multiple of studs are included that extend from each of the multiple of liner panels through the support shell.

In a further embodiment of any of the foregoing embodiments of the present disclosure, the multiple of studs extend from each of the multiple of liner panels generally parallel to the intermediate circumferential rail.

In a further embodiment of any of the foregoing embodiments of the present disclosure, the contoured region extends toward a forward circumferential rail and an aft circumferential rail of at least one of the multiple of liner panels.

In a further embodiment of any of the foregoing embodiments of the present disclosure, the multiple of studs include a first row of studs that extend from each of the multiple of liner panels generally forward of the intermediate circumferential rail and a second row of studs that extend from each of the multiple of liner panels generally aft of the intermediate circumferential rail.

In a further embodiment of any of the foregoing embodiments of the present disclosure, the contoured region extends toward a forward circumferential rail and an aft circumferential rail that extend from each of the multiple of liner panels.

In a further embodiment of any of the foregoing embodiments of the present disclosure, the contoured region extends toward the intermediate circumferential rail and an aft circumferential rail that extend from each of the multiple of liner panels.

In a further embodiment of any of the foregoing embodiments of the present disclosure, the contoured region defines a hyperbolic cosine (COSH) profile.

In a further embodiment of any of the foregoing embodiments of the present disclosure, the contoured region defines a constant curve profile.

In a further embodiment of any of the foregoing embodiments of the present disclosure, the contoured region defines a straight taper that extends toward the multiple of liner panels.

In a further embodiment of any of the foregoing embodiments of the present disclosure, the at least one convergent passage is directed axially aft.

In a further embodiment of any of the foregoing embodiments of the present disclosure, the at least one convergent passage is directed axially forward.

In a further embodiment of any of the foregoing embodiments of the present disclosure, the at least one convergent passage includes a forward convergent passage directed axially forward and an aft convergent passage directed axially aft.

In a further embodiment of any of the foregoing embodiments of the present disclosure, the at least one convergent passage includes a forward convergent passage directed axially aft and an aft convergent passage directed axially aft.

In a further embodiment of any of the foregoing embodiments of the present disclosure, the support shell is at least one of an outer support shell and an inner support shell.

In a further embodiment of any of the foregoing embodiments of the present disclosure, the support shell is located within an augmentor section, an exhaust duct section and/or a nozzle section of a gas turbine engine.

A method of cooling a wall assembly for a component of a gas turbine engine, according to another disclosed non-limiting embodiment of the present disclosure, includes directing cooling air into at least one convergent passage between a support shell and at least one of a multiple of liner panels.

In a further embodiment of any of the foregoing embodiments of the present disclosure, the method includes defining the at least one convergent passage with a contoured region of the support shell.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
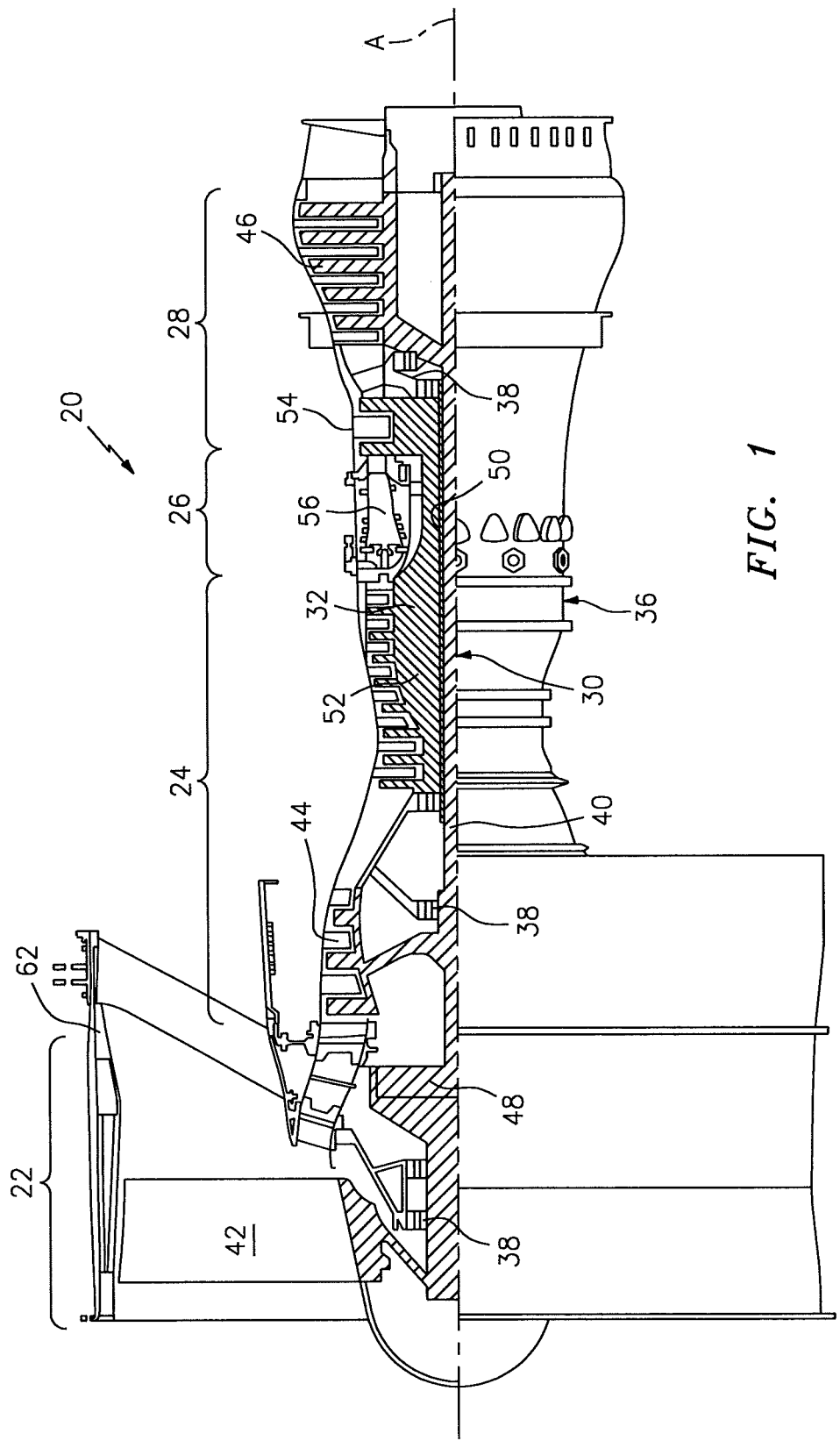
FIG. 1 is a schematic cross-section of an example gas turbine engine architecture.
Figure 2:
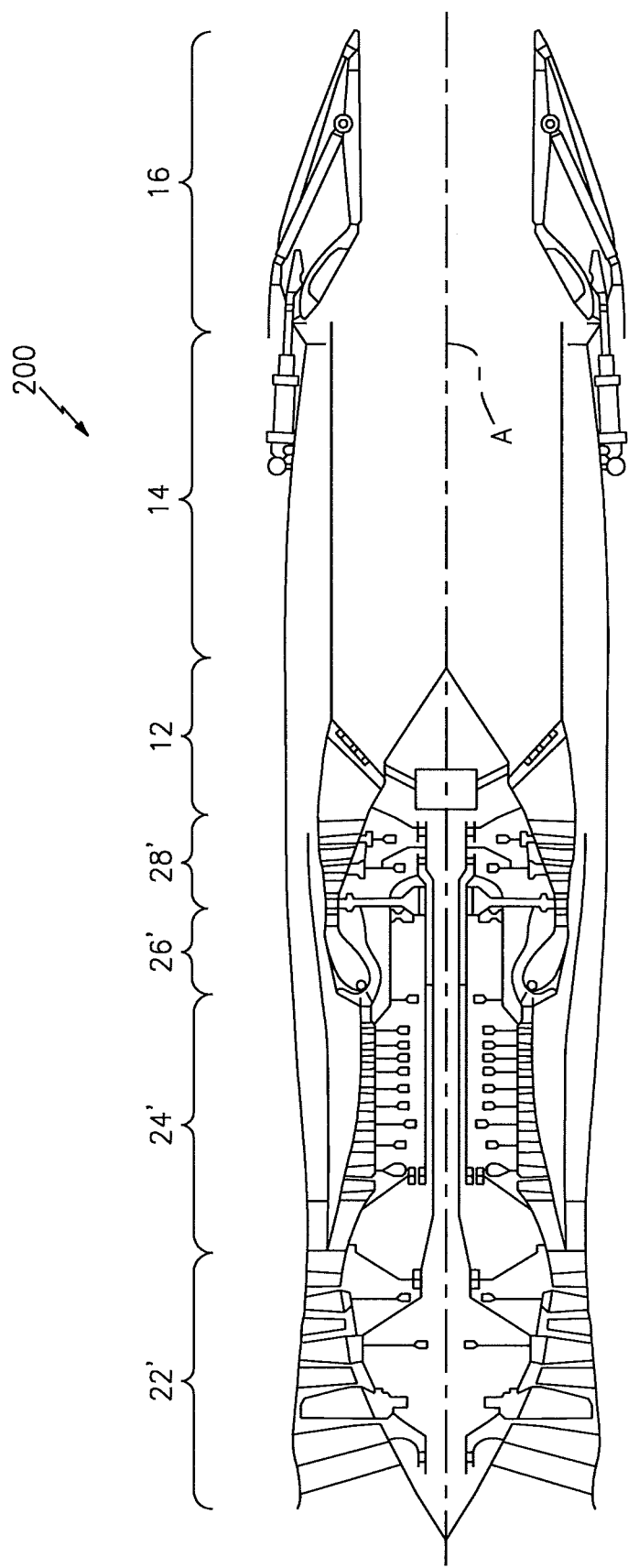
FIG. 2 is a schematic cross-section of another example gas turbine engine architecture.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Referring to FIG. 2, alternative engine architectures 200 might include an augmentor section 12, an exhaust duct section 14 and a nozzle section 16 in addition to the fan section 22', compressor section 24', combustor section 26' and turbine section 28' among other systems or features. Referring again to FIG. 1, the fan section 22 drives air along a bypass flowpath and into the compressor section 24. The compressor section 24 drives air along a core flowpath for compression and communication into the combustor section 26, which then expands and directs the air through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an Intermediate Pressure Compressor ("IPC") between a Low Pressure Compressor ("LPC") and a High Pressure Compressor ("HPC"), and an Intermediate Pressure Turbine ("IPT") between a High Pressure Turbine ("HPT") and a Low Pressure Turbine ("LPT").

The engine 20 generally includes a low spool 30 and a high spool 32 mounted for rotation about an engine central longitudinal axis A relative to an engine static structure 36 via several bearing structures 38. The low spool 30 generally includes an inner shaft 40 that interconnects a fan 42, a low pressure compressor ("LPC") 44 and a low pressure turbine ("LPT") 46. The inner shaft 40 may drive the fan 42 directly or through a geared architecture 48 as illustrated in FIG. 1 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor ("HPC") 52 and a high pressure turbine ("HPT") 54. A combustor 56 is arranged between the HPC 52 and the HPT 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. The main engine shafts 40, 50 are supported at a plurality of points by the bearing systems 38 within the static structure 36.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3, and in another example is greater than about 2.5:1. The geared turbofan enables operation of the low spool 30 at higher speeds which can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("Tram"/518.7)$^{0.5}$. The Low Corrected Fan Tip Speed according to one non-limiting embodiment of the example gas turbine engine 20 is less than about 1150 fps (351 m/s).

Figure 3:
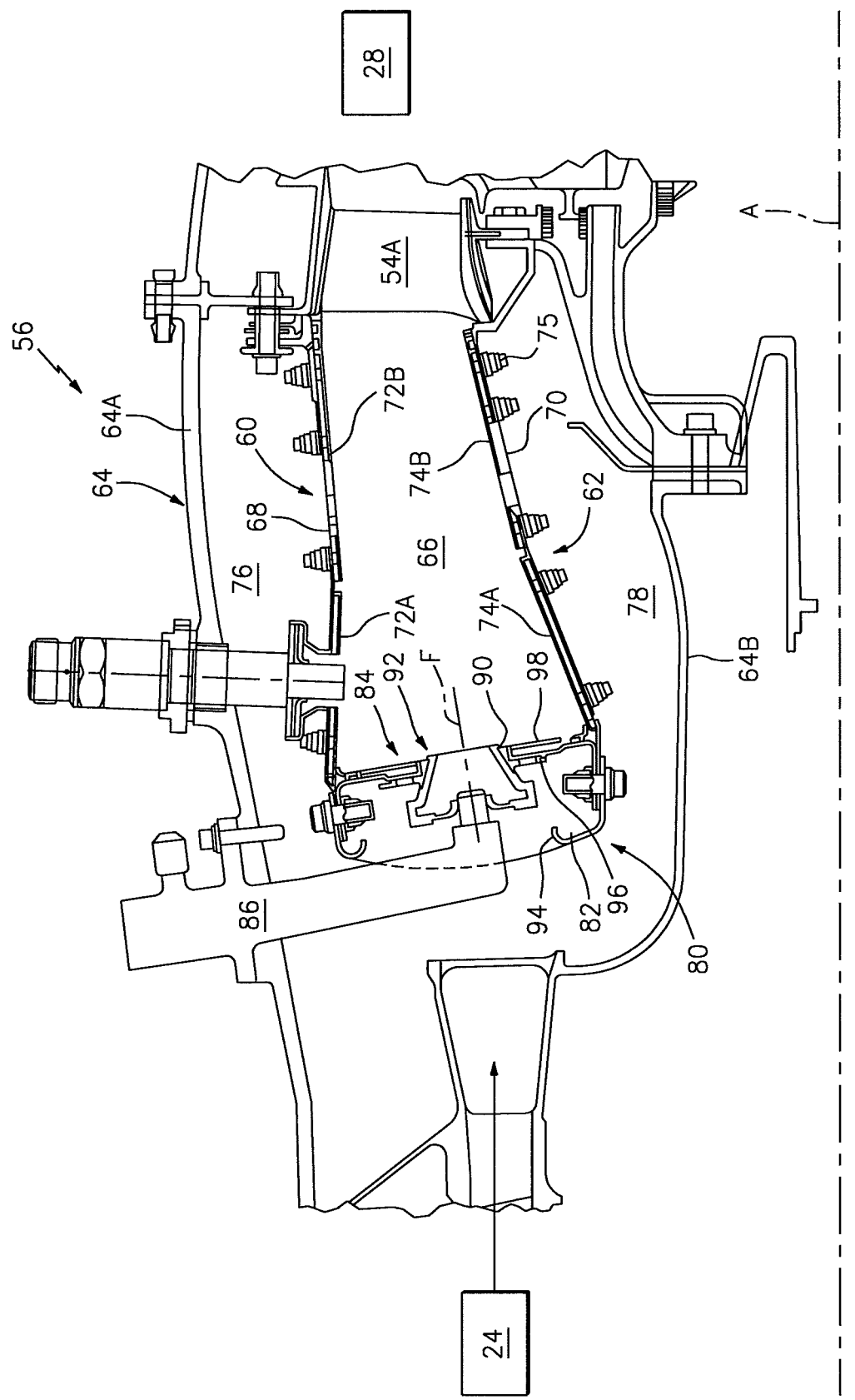
FIG. 3 is an expanded longitudinal schematic sectional view of a combustor section according to one non-limiting embodiment that may be used with the example gas turbine engine architectures shown in FIGS. 1 and 2.

With reference to FIG. 3, the combustor section 26 generally includes a combustor 56 with an outer combustor wall assembly 60, an inner combustor wall assembly 62 and a diffuser case module 64. The outer combustor wall assembly 60 and the inner combustor wall assembly 62 are spaced apart such that a combustion chamber 66 is defined therebetween. The combustion chamber 66 is generally annular in shape to surround the engine central longitudinal axis A.

The outer combustor liner assembly 60 is spaced radially inward from an outer diffuser case 64A of the diffuser case module 64 to define an outer annular plenum 76. The inner combustor liner assembly 62 is spaced radially outward from an inner diffuser case 64B of the diffuser case module 64 to define an inner annular plenum 78. It should be understood that although a particular combustor is illustrated, other combustor types with various combustor liner arrangements will also benefit herefrom. It should be further understood that the disclosed cooling flow paths are but an illustrated embodiment and should not be limited only thereto.

The combustor wall assemblies 60, 62 contain the combustion products for direction toward the turbine section 28. Each combustor wall assembly 60, 62 generally includes a respective support shell 68, 70 which supports one or more liner panels 72A-B (generally referred to as "72"), 74A-B (generally referred to as "74") mounted thereto that are arranged to form a liner array. The support shells 68, 70 may be manufactured by, for example, the hydroforming of a sheet metal alloy to provide the generally cylindrical outer shell 68 and inner shell 70. Each of the liner panels 72, 74 may be generally rectilinear with a circumferential arc. The liner panels 72, 74 may be manufactured of, for example, a nickel based super alloy, ceramic or other temperature resistant material. In one disclosed non-limiting embodiment, the liner array includes a multiple of forward liner panels 72A and a multiple of aft liner panels 72B that are circumferentially staggered to line the outer shell 68. A multiple of forward liner panels 74A and a multiple of aft liner panels 74B are circumferentially staggered to line the inner shell 70.

The combustor 56 further includes a forward assembly 80 immediately downstream of the compressor section 24 to receive compressed airflow therefrom. The forward assembly 80 generally includes a cowl 82, a bulkhead assembly 84, and a multiple of swirlers 90 (one shown). Each of the swirlers 90 is circumferentially aligned with one of a multiple of fuel nozzles 86 (one shown) and the respective hood ports 94 to project through the bulkhead assembly 84.

The bulkhead assembly 84 includes a bulkhead support shell 96 secured to the combustor walls 60, 62, and a multiple of circumferentially distributed bulkhead liner panels 98 secured to the bulkhead support shell 96 around the swirler opening. The bulkhead support shell 96 is generally annular and the multiple of circumferentially distributed bulkhead liner panels 98 are segmented, typically one to each fuel nozzle 86 and swirler 90.

The cowl 82 extends radially between, and is secured to, the forwardmost ends of the combustor walls 60, 62. The cowl 82 includes a multiple of circumferentially distributed hood ports 94 that receive one of the respective multiple of fuel nozzles 86 and facilitates the direction of compressed air into the forward end of the combustion chamber 66 through a swirler opening 92. Each fuel nozzle 86 may be secured to the diffuser case module 64 and project through one of the hood ports 94 and through the swirler opening 92 within the respective swirler 90.

The forward assembly 80 introduces core combustion air into the forward section of the combustion chamber 66 while the remainder enters the outer annular plenum 76 and the inner annular plenum 78. The multiple of fuel nozzles 86 and adjacent structure generate a blended fuel-air mixture that supports stable combustion in the combustion chamber 66.

Opposite the forward assembly 80, the outer and inner support shells 68, 70 are mounted to a first row of Nozzle Guide Vanes (NGVs) 54A in the HPT 54. The NGVs 54A are static engine components which direct core airflow combustion gases onto the turbine blades of the first turbine rotor in the turbine section 28 to facilitate the conversion of pressure energy into kinetic energy. The core airflow combustion gases are also accelerated by the NGVs 54A because of their convergent shape and are typically given a "spin" or a "swirl" in the direction of turbine rotor rotation. The turbine rotor blades absorb this energy to drive the turbine rotor at high speed.

Figure 4:
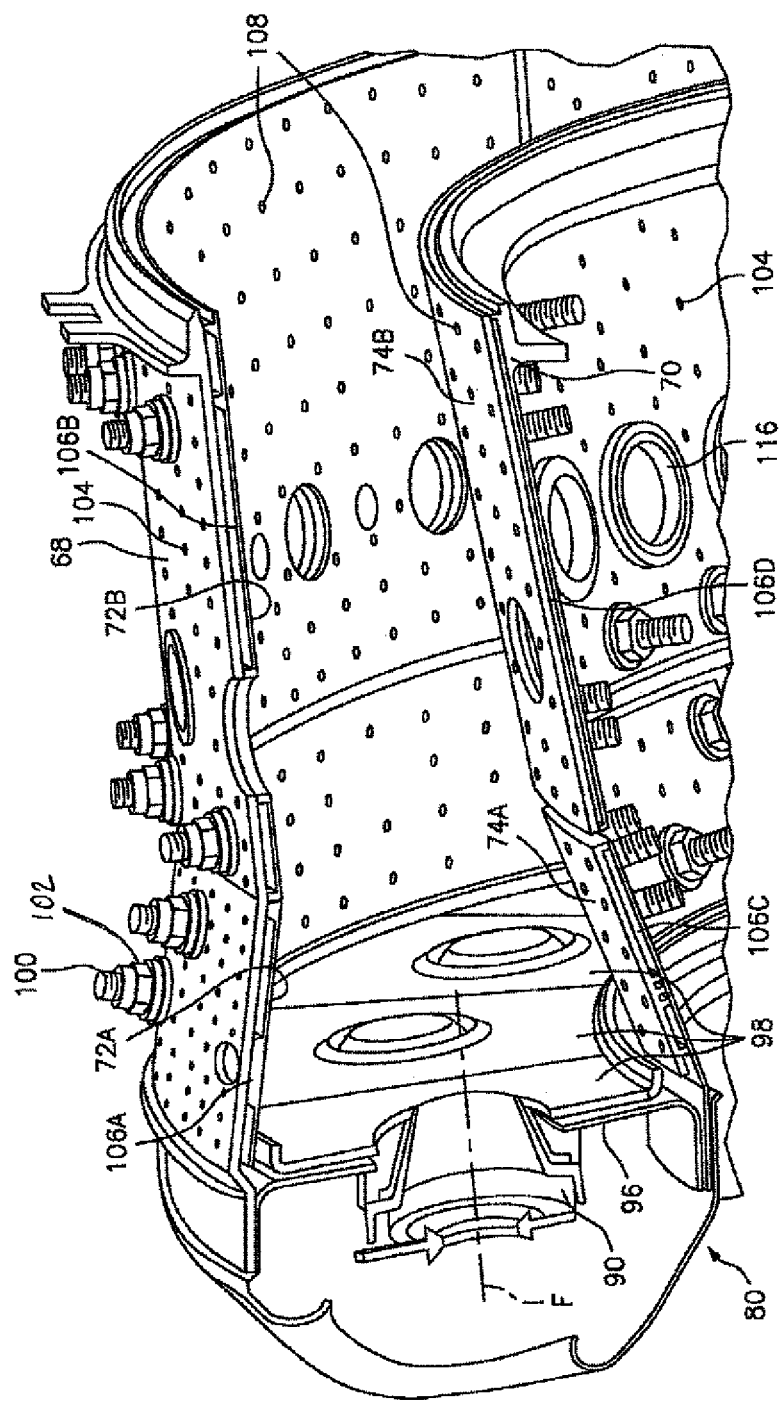
FIG. 4 is an expanded partial sectional view of a portion of a combustor wall assembly illustrating a contoured region of a support shell according to one disclosed non-limiting embodiment.

With reference to FIG. 4, a multiple of studs 100 extend from the liner panels 72, 74 so as to permit the liner panels 72, 74 to be mounted to their respective support shells 68, 70 with fasteners 102 such as nuts. That is, the studs 100 project rigidly from the liner panels 72, 74 and through the respective support shells 68, 70 to receive the fasteners 102 at a threaded distal end section thereof.

A multiple of cooling impingement passages 104 penetrate through the support shells 68, 70 to allow air from the respective annular plenums 76, 78 to enter cavities 106A, 106B, 106C, 106D formed in the combustor walls 60, 62 between the respective support shells 68, 70 and liner panels 72, 74. The cooling impingement passages 104 are generally normal to the surface of the liner panels 72, 74. The air in the cavities 106A, 106B, 106C, 106D provide cold side impingement cooling of the liner panels 72, 74 that is generally defined herein as heat removal via internal convection.

A multiple of effusion passages 108 penetrate through each of the liner panels 72, 74. The geometry of the passages 108 (e.g., diameter, shape, density, surface angle, incidence angle, etc.) as well as the location of the passages 108 with respect to the high temperature main flow also contributes to effusion film cooling. The combination of impingement passages 104 and effusion passages 108 may be referred to as an Impingement Film Floatwall (IFF) assembly.

The effusion passages 108 allow the air to pass from the cavities 106A, 106B, 106C, 106D defined in part by a cold side 110 of the liner panels 72, 74 to a hot side 112 of the liner panels 72, 74 and thereby facilitate the formation of a thin, cool, insulating blanket or film of cooling air along the hot side 112. The effusion passages 108 are generally more numerous than the impingement passages 104 to promote the development of film cooling along the hot side 112 to sheath the liner panels 72, 74. Film cooling as defined herein is the introduction of a relatively cooler air at one or more discrete locations along a surface exposed to a high temperature environment to protect that surface in the region of the air injection as well as downstream thereof.

A multiple of dilution passages 116 may penetrate through both the respective support shells 68, 70 and liner panels 72, 74 along a common axis. For example only, in a Rich-Quench-Lean (R-Q-L) type combustor, the dilution passages 116 are located downstream of the forward assembly 80 to quench the hot combustion gases within the combustion chamber 66 by direct supply of cooling air from the respective annular plenums 76, 78.

Figure 5:
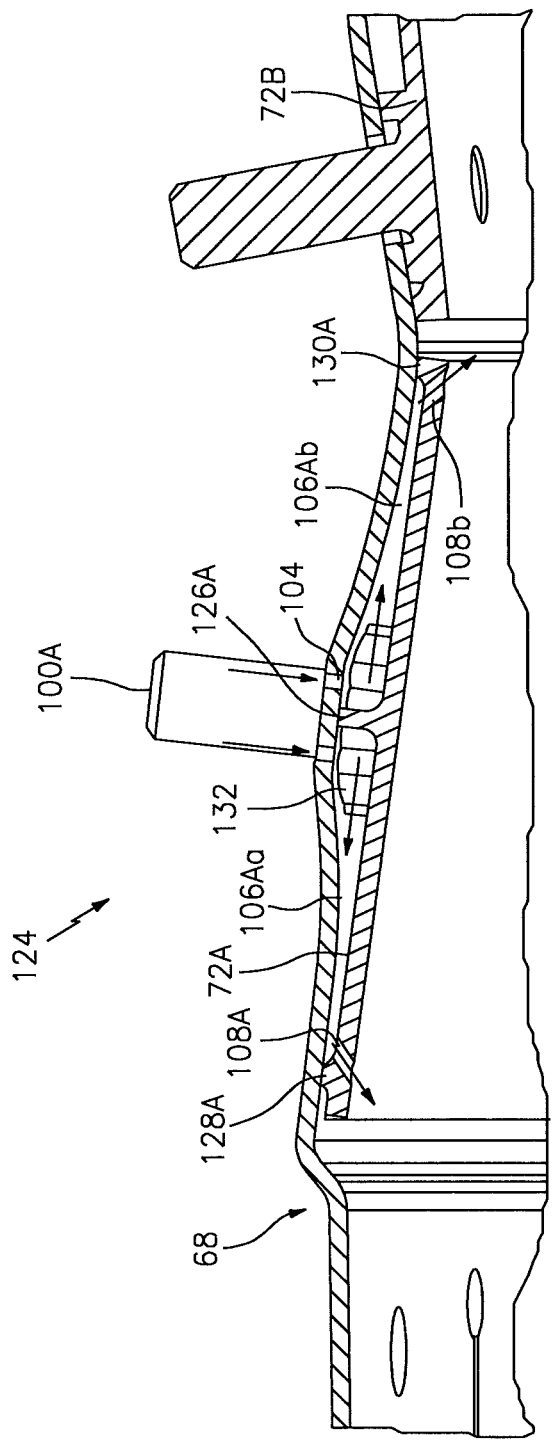
FIG. 5 is an expanded longitudinal sectional view of a forward outer portion of a combustor wall assembly illustrating a contoured region of a support shell according to one disclosed non-limiting embodiment.

With reference to FIG. 5, in one disclosed non-limiting embodiment, each of the respective support shells 68, 70 are at least partially non-parallel with respect to the forward liner panels 72A, 74A to form a convergent passage 120 therebetween at a contoured region 124. That is, the contoured region 124 is a radially displaced profile section of the respective support shells 68, 70. Although the forward liner panels 72A, and the respective forward portion of the outer support shell 68 will be specifically described and illustrated in each of the disclosed non-limiting embodiments, it should be appreciated that the inner support shell 70 as well as various other wall assemblies within a gas turbine engine such as within the walls of the augmentor section 12, the exhaust duct section 14 and the nozzle section 16 (see FIG. 2) may alternatively or additionally benefit herefrom. That is, the contoured region 124 may alternatively or additionally located within engine sections other than the combustor section 26 which utilize a support shell, liner panel type wall arrangement.

Figure 6:
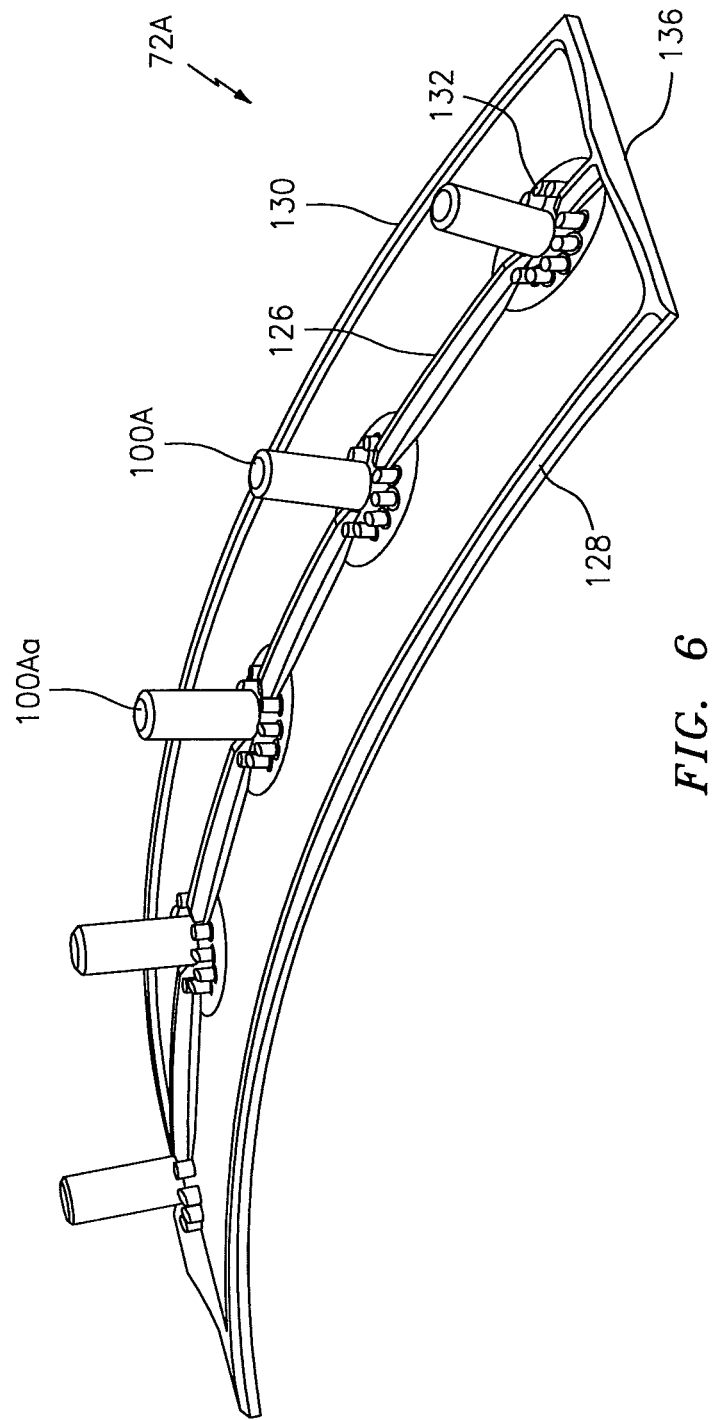
FIG. 6 is a perspective view of a liner panel.

In this disclosed non-limiting embodiment, the contoured region 124 of the support shell 68 defines a hyperbolic cosine (COSH) profile in longitudinal cross-section that extends away from the forward liner panels 72A. That is, the forward liner panels 72A are generally linear in longitudinal cross-section, while the contoured region 124 is non-linear in longitudinal cross-section. For perspective, in this disclosed non-limiting embodiment, each of the forward liner panels 72A define an axial length of about 1.5 inches (38 mm) and each may extend over a circumferential arc of about forty (40) degrees (one shown in FIG. 6).

The contoured region 124 is located adjacent to a row of studs 100A and an intermediate circumferential rail 126 located between a forward circumferential rail 128 and an aft circumferential rail 130. Each of the studs 100A may be at least partially surrounded by posts 132 to at least partially support and operate as stand-offs between the support shell 68 and the forward liner panels 72A.

Figure 7:
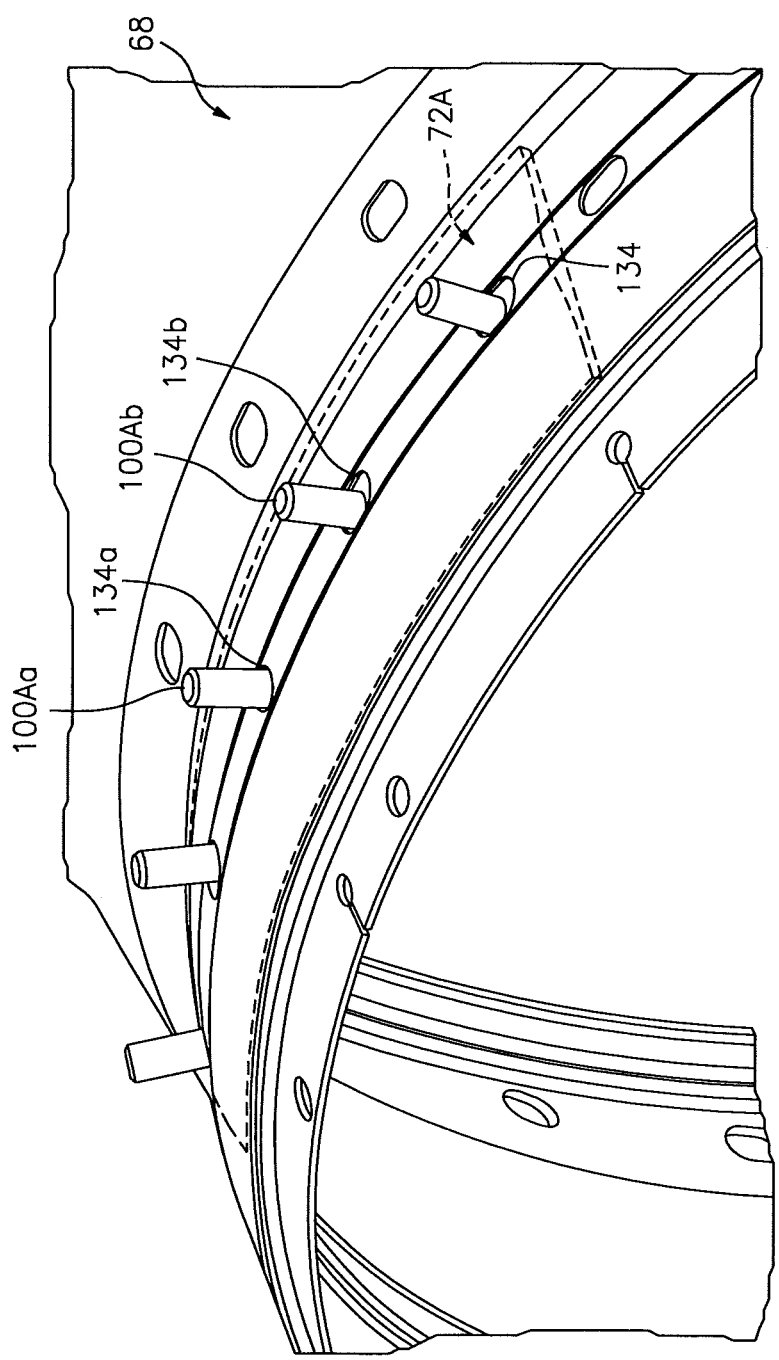
FIG. 7 is a perspective partial view of the liner panel of FIG. 6 manned to a support shell.

Each of the forward liner panels 72A include a single row of studs 100A (five shown in FIGS. 6 and 7) that extend through respective stud apertures 134 in the support shell 68. A center or "king" stud 100Aa is received within a central circular stud aperture 134a while the remainder of the studs 100Ab are received within elongated apertures 134b to facilitate operational thermal growth relative to the center or "king" stud 100Aa (see FIG. 7).

Axial end rails 136 (see FIGS. 6 and 7) are contoured to correspond with the contoured region 124 to circumferentially close-out each forward liner panels 72A with respect to the support shell 68. That is, the forward circumferential rail 128 and the aft circumferential rail 130 are located at relatively constant curvature axial interfaces while the axial end rails 136 extend across an axial length of the support shell 68 and include a matched contour to follow the contoured region 124.

With continued reference to FIG. 5, the contoured region 124 forms a cavity 106A that converges toward the forward circumferential rail 128 and the aft circumferential rail 130. The cavity 106A is further subdivided by the intermediate circumferential rail 126 into a forward cavity 106Aa and an aft cavity 106Ab. The forward cavity 106Aa and the aft cavity 106Ab thereby accelerate and direct impingement airflow from impingement passages 104 on each respective side of the intermediate circumferential rail 126 toward forward effusion apertures 108a and aft effusion apertures 108b. The forward effusion apertures 108a and the aft effusion apertures 108b may define respective angles through the forward liner panels 72A to direct effusion airflow generally forward and aft into the combustion chamber 66. It should be appreciated that various contours and configurations are possible to tailor the location of the effusion air passages to optimize heat transfer, pressure loss, manufacturability, etc., without need for additional hardware between the respective support shell 68 and the forward liner panels 72A.

Figure 8:
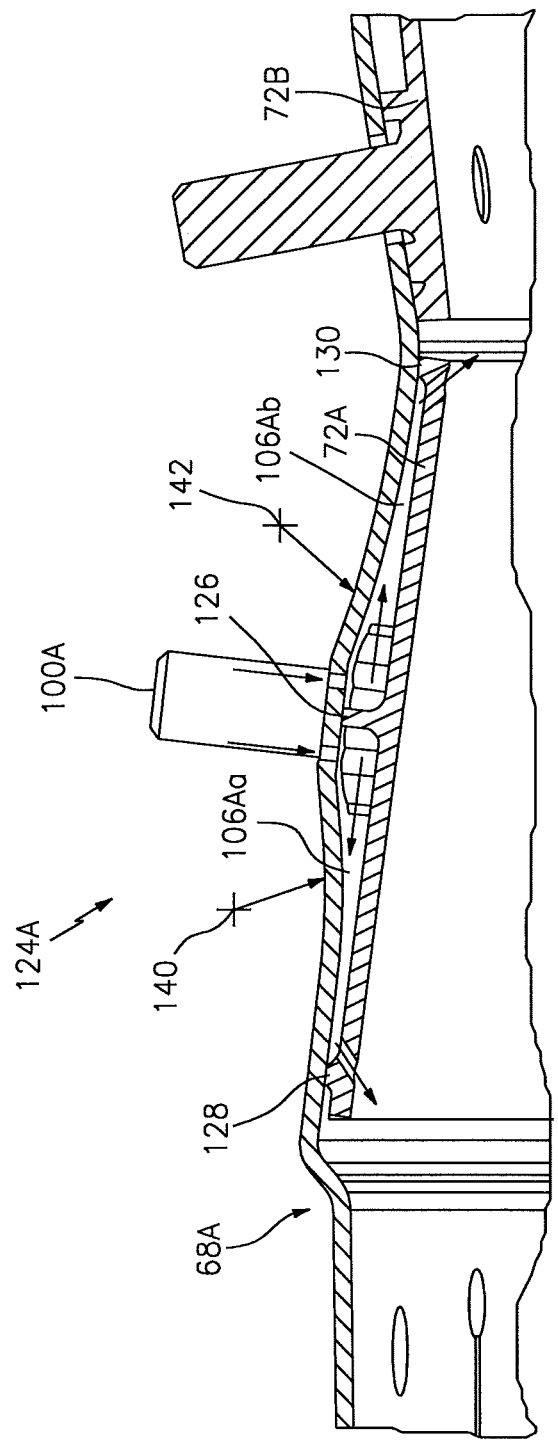
FIG. 8 is an expanded longitudinal sectional view of a forward outer portion of a combustor wall assembly illustrating a contoured region of a support shell according to one disclosed non-limiting embodiment.

With reference to FIG. 8, in another disclosed non-limiting embodiment, a contoured region 124A of the support shell 68 defines a constant curvature profile in longitudinal cross-section that extends away from the forward liner panels 72A. The constant curvature profile is relatively easier to manufacture and inspect as compared to contoured region 124 (see FIG. 5). The contoured region 124A is defined by a relatively simple forward curve 140 with a tangency point and angle and an aft curve 142 with a tangency point and angle. That is, the curves 140, 142 are blended to form the contoured region 124A. For example, in this non-limiting embodiment, the contoured region 124A lies within, for example, 0.002 inches (0.05 mm) of the profile of contoured region 124 (see FIG. 5) at all locations. It should be appreciated that various such curvature arrangements may alternatively or additionally be defined.

Figure 9:
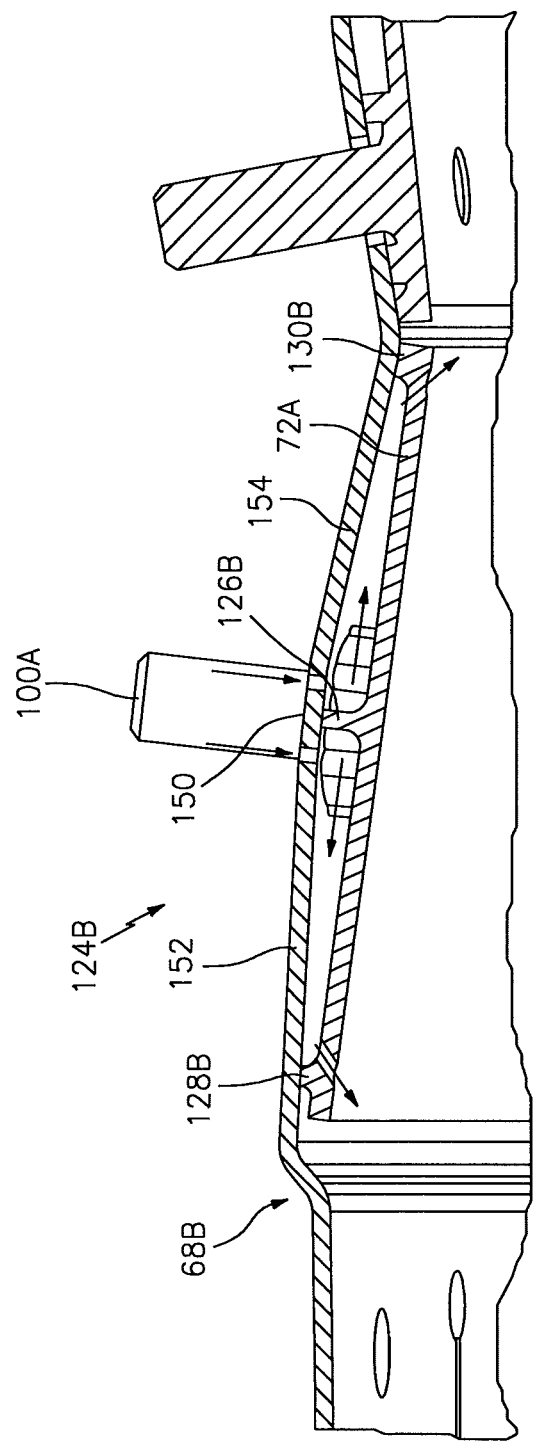
FIG. 9 is an expanded longitudinal sectional view of a forward outer portion of a combustor wall assembly illustrating a contoured region of a support shell according to one disclosed non-limiting embodiment.

With reference to FIG. 9, in another disclosed non-limiting embodiment, a contoured region 124B of the support shell 68B defines a straight taper profile in longitudinal cross-section that extends away from the forward liner panels 72A. The straight profile is generally defined from a flat 150 adjacent to the studs 100A and posts 132 that then extends radially inward along ramped surfaces 152, 154 to taper and converge toward the respective forward circumferential rail 128B and the aft circumferential rail 130B. It should be appreciated that the straight provide may be defined at various ramp angles to provide a desired tailored impingement. The straight profile is even easier to manufacture and inspect as compared to the contoured region 124A but may provide relatively less convergence/heat transfer.

Figure 10:
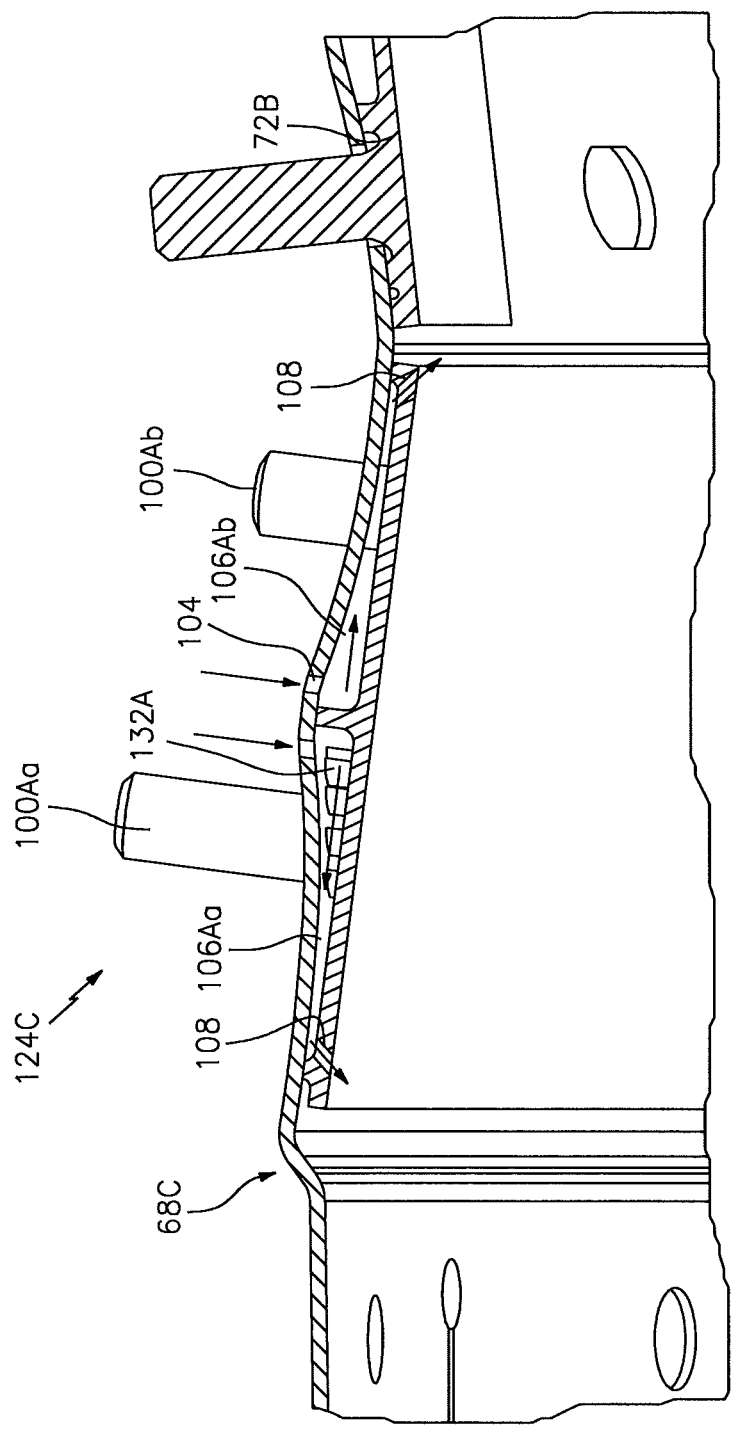
FIG. 10 is an expanded longitudinal sectional view of a forward outer portion of a combustor wall assembly illustrating a contoured region of a support shell according to one disclosed non-limiting embodiment.

With reference to FIG. 10, in another disclosed non-limiting embodiment, a contoured region 124C of the support shell 68 forms a cavity 106C that is further subdivided by the intermediate circumferential rail 126 into the forward cavity 106Aa and the aft cavity 106Ab. A forward row of studs 100Aa is located the forward cavity 106Aa and a second row of studs 100Ab is located through the aft cavity 106Ab. The respective posts 132a, 132b are contoured to follow the contoured region 124C. Although the multiple row of studs 100Aa, 100Ab may somewhat complicate the interface between each of the forward liner panels 72A and the contoured region 124C, the surface area of the contoured region 124C adjacent the intermediate circumferential rail 126 are freed of stud apertures and hardware to facilitate additional or otherwise specifically tailored pattern of effusion passages 104.

Figure 11:
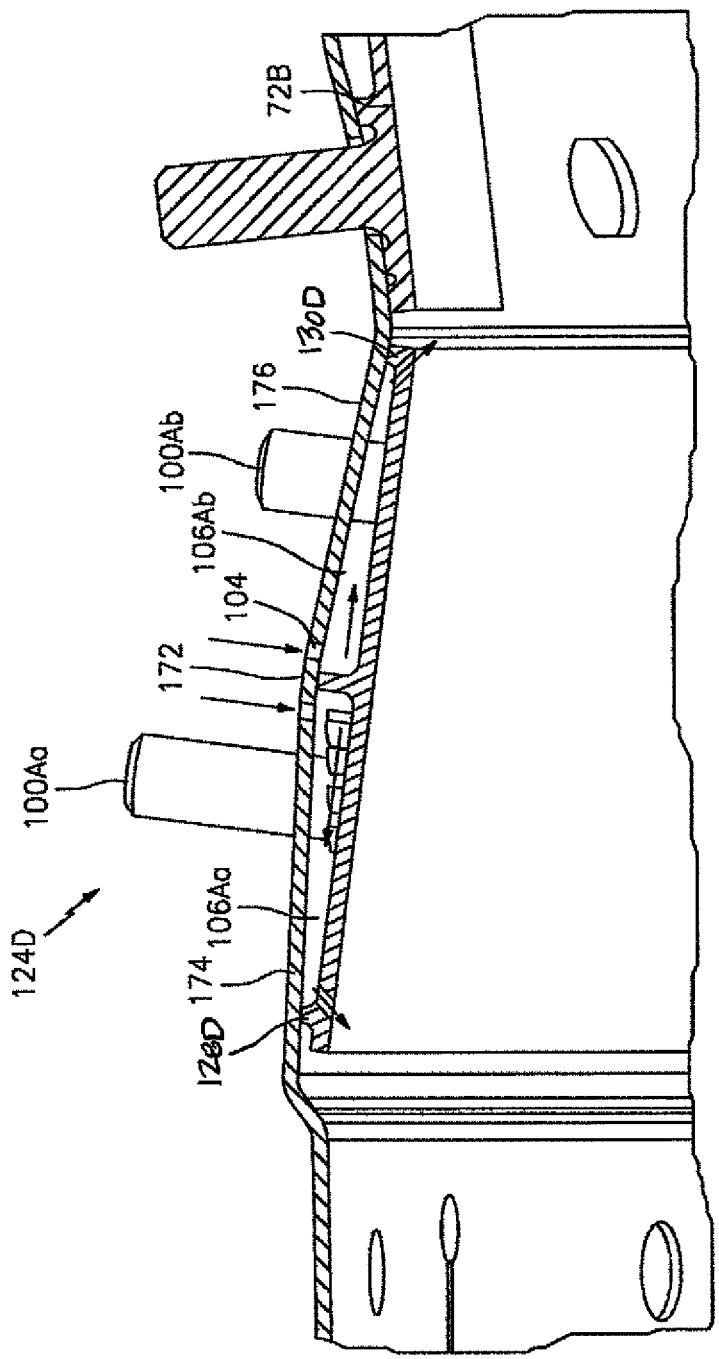
FIG. 11 is an expanded longitudinal sectional view of a forward outer portion of a combustor wall assembly illustrating a contoured region of a support shell according to one disclosed non-limiting embodiment.

With reference to FIG. 11, in another disclosed non-limiting embodiment, a contoured region 124D of the support shell 68D includes a straight taper profile with the forward row of studs 100Aa and the second row of studs 100Ab. The straight taper profile is generally defined from a peak 172 adjacent to the intermediate circumferential rail 126 then extends radially inward along ramped surfaces 174, 176 to taper and converge toward the respective forward circumferential rail 128D and the aft circumferential rail 130D. Notably, the ramped surfaces 174, 176 extend beyond the respective forward circumferential rail 128D and the aft circumferential rail 130D.

Figure 12:
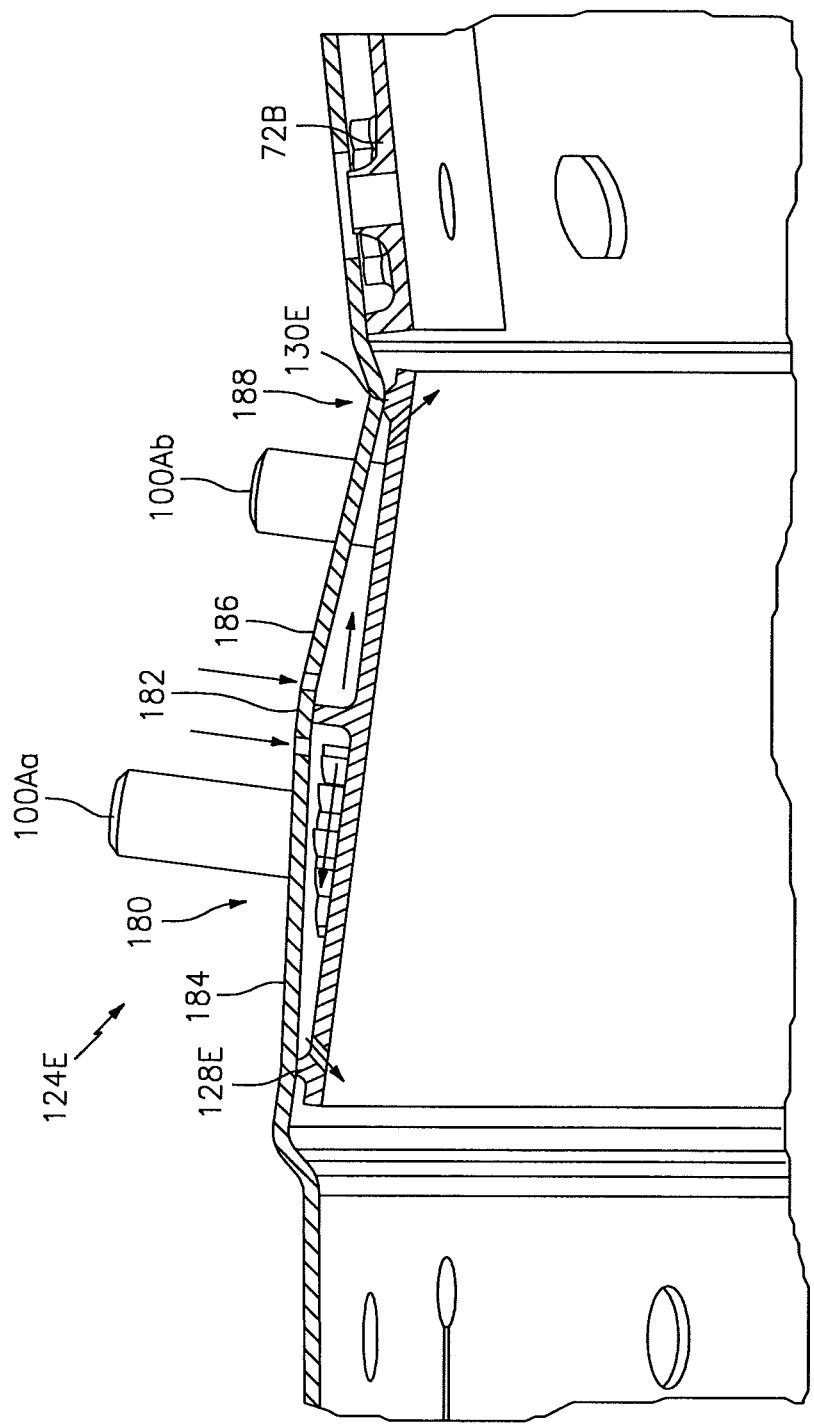
FIG. 12 is an expanded longitudinal sectional view of a forward outer portion of a combustor wall assembly illustrating a contoured region of a support shell according to one disclosed non-limiting embodiment.

With reference to FIG. 12, in another disclosed non-limiting embodiment, a contoured region 124E of the support shell 68E includes a straight taper profile 180 which defines a peak 182 with ramped surfaces 184, 186 the extend into a contact interface with the respective circumferential rail 128E and the aft circumferential rail 130E. Notably, the ramped surface 186 changes direction to essentially form a kink 188. That is, the kink 188 permits the multiple of aft liner panels 72B to be radially displaced further than those of FIG. 11.

Figure 13:
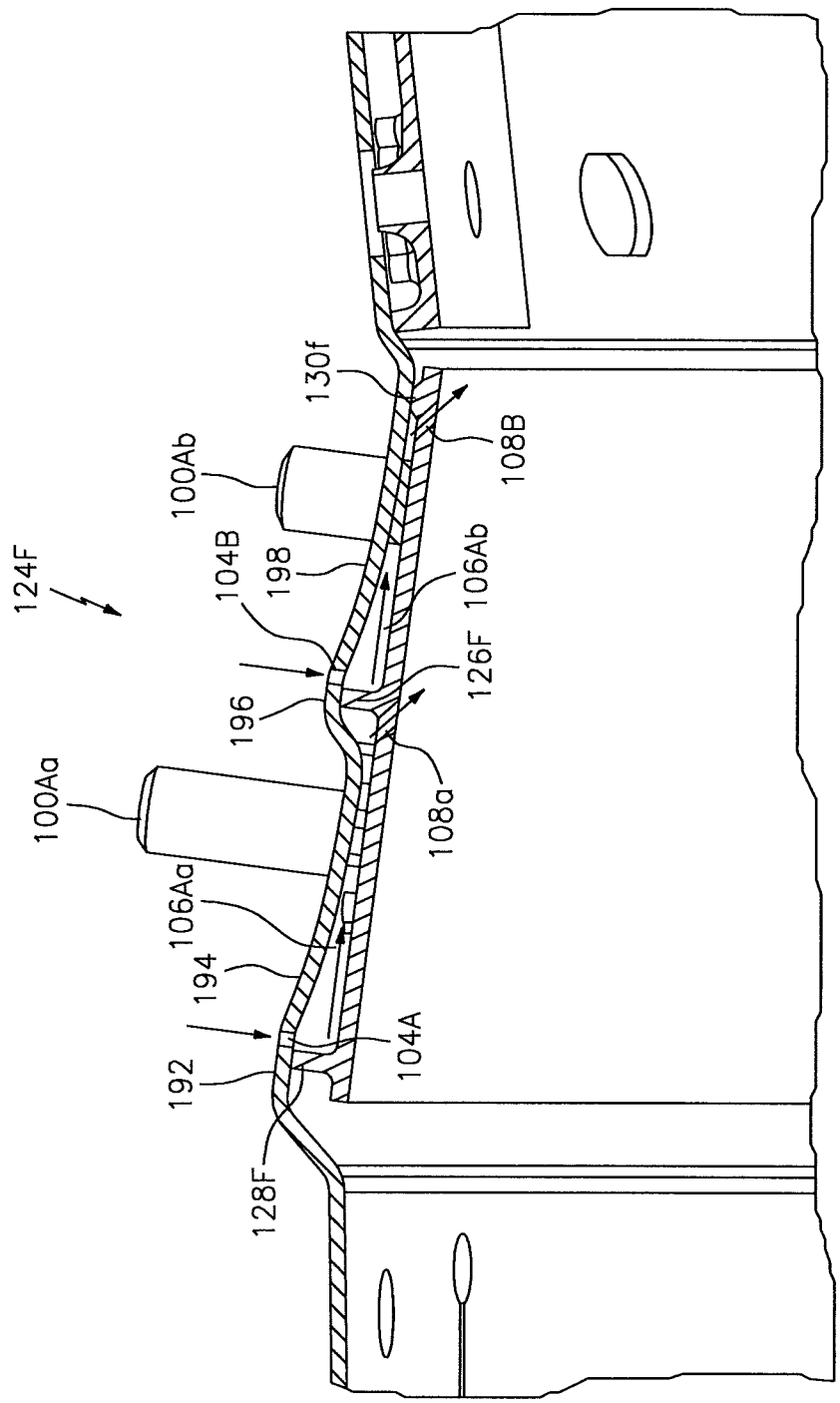
FIG. 13 is an expanded longitudinal sectional view of a forward outer portion of a combustor wall assembly illustrating a contoured region of a support shell according to one disclosed non-limiting embodiment.

With reference to FIG. 13, in another disclosed non-limiting embodiment, a contoured region 124F of the support shell 68F includes a multi-contoured profile which defines a first peak 192 with a first convergent surface 194 associated with the forward circumferential rail 128F and a second peak 196 with a second convergent surface 198 associated with the intermediate circumferential rail 126. Although somewhat more complex, the multi-contoured profile 190 facilitates unidirectional cooling flow from fore to aft. Further, the multi-contoured profile 190 may be specifically tailored in an axial direction.

The cavity 106A is subdivided by the intermediate circumferential rail 126F into a forward cavity 106Aa and an aft cavity 106Ab. The forward cavity 106Aa and the aft cavity 106Ab thereby accelerate and direct impingement airflow from impingement passages 104a, 104b located downstream of the respective forward circumferential rail 128 and intermediate circumferential rail 126F toward intermediate effusion apertures 108a and aft effusion apertures 108b located respectively just upstream of the intermediate circumferential rail 126F and aft circumferential rail 130F.

The forward effusion apertures 108a and the aft effusion apertures 108b may define respective angles through the forward liner panels 72A to direct effusion airflow generally aft into the combustion chamber 66 (see FIG. 3). It should be appreciated that various contours and configurations are possible to tailor the location of the effusion air passages to optimize heat transfer, pressure loss, manufacturability, etc., without need for additional hardware between the respective support shell 68 and the forward liner panels 72A.

Figure 14:
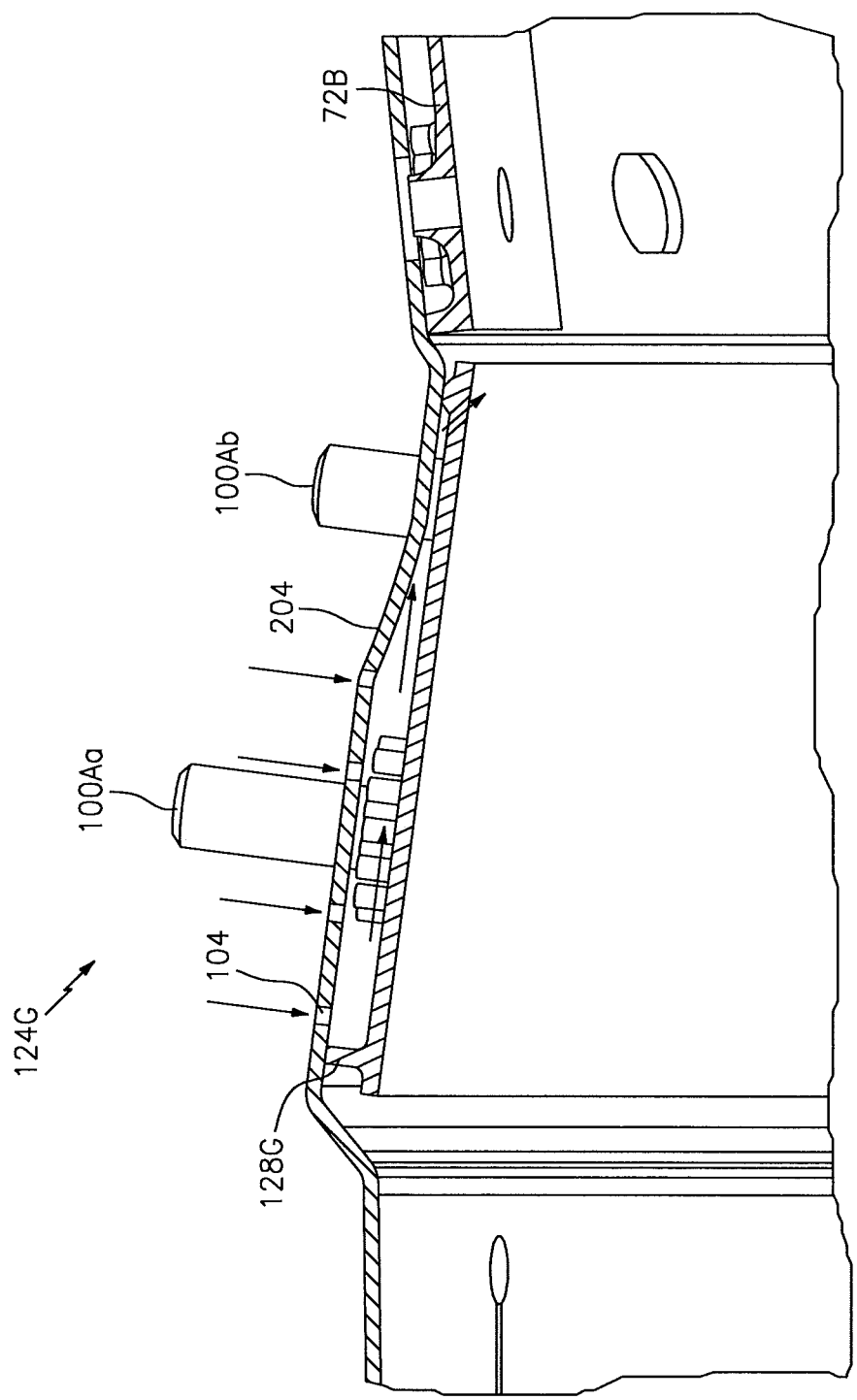
FIG. 14 is an expanded longitudinal sectional view of a forward outer portion of a combustor wall assembly illustrating a contoured region of a support shell according to one disclosed non-limiting embodiment.

With reference to FIG. 14, in another disclosed non-limiting embodiment, a contoured region 124G of the support shell 68G includes a straight taper profile with the forward row of studs 100Aa through a straight region 202 and a second row of studs 100Ab through the tapered region 204. The straight taper profile is generally defined from the straight region 202 adjacent to the forward circumferential rail 128G then extends radially inward along the tapered region 204 to taper and converge toward the aft circumferential rail 130G. Various impingement apertures 104 may be located through the straight region 202. The aft effusion apertures 108b are located respectively just upstream of the aft circumferential rail 130G to facilitate unidirectional cooling flow from fore to aft, however, various additional and alternative effusion apertures may be utilized to tailor the cooling flow.

The various contoured regions 124-124G of the support shell 68 form one or more convergent passages for panel cooling air by varying the profile of the combustor shell adjacent to the liner panels. Various contours and configurations are possible to tailor the location of the effusion air exit, and optimize heat transfer, pressure loss, manufacturability, NOx reduction, etc. Beneficially, the countered regions do not require additional hardware over conventional float wall combustor panels to create the convergence and can be produced using current manufacturing methods.

The use of the terms "a" and "an" and "the" and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other. It should be appreciated that relative positional terms such as "forward," "aft," "upper," "lower," "above," "below," and the like are with reference to the normal operational attitude of the vehicle and should not be considered otherwise limiting.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be appreciated that like reference numerals identify corresponding or similar elements throughout the several drawings. It should also be appreciated that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be appreciated that within the scope of the appended claims, the disclosure may be practiced other than as specifically described. For that reason the appended claims should be studied to determine true scope and content.

What is claimed is:

1. A wall assembly within a gas turbine engine, comprising:
    a multiple of gas turbine engine liner panels comprising a first liner panel that includes a forward circumferential rail, an aft circumferential rail and an intermediate circumferential rail between the forward circumferential rail and the aft circumferential rail, the intermediate circumferential rail having a first radial height that is greater than at least one of a second radial height of the forward circumferential rail or a third radial height of the aft circumferential rail; and a support shell with a contoured region defining at least one convergent passage between the support shell and the first liner panel.

2. The wall assembly as recited in claim 1, wherein the multiple of gas turbine engine liner panels are forward liner panels within a combustor.

3. The wall assembly as recited in claim 1, wherein the contoured region is centered with respect to the intermediate circumferential rail.

4. The wall assembly as recited in claim 3, further comprising a multiple of studs that extend from the first liner panel through the support shell.

5. The wall assembly as recited in claim 4, wherein the multiple of studs extend from the first liner panel generally parallel to the intermediate circumferential rail.

6. The wall assembly as recited in claim 5, wherein the contoured region extends toward the forward circumferential rail and the aft circumferential rail.

7. The wall assembly as recited in claim 4, wherein the multiple of studs include
a first stud that extends from the first liner panel and is forward of the intermediate circumferential rail; and
a second stud that extends from the first liner panel and is aft of the intermediate circumferential rail.

8. The wall assembly as recited in claim 7, wherein the contoured region extends toward the forward circumferential rail and the aft circumferential rail.

9. The wall assembly as recited in claim 7, wherein the contoured region extends toward the intermediate circumferential rail and the aft circumferential rail.

10. The wall assembly as recited in claim 1, wherein the contoured region defines a hyperbolic cosine (COSH) profile.

11. The wall assembly as recited in claim 1, wherein the contoured region defines a constant curve profile.

12. The wall assembly as recited in claim 1, wherein the contoured region defines a straight taper that extends toward the multiple of gas turbine engine liner panels.

13. The wall assembly as recited in claim 1, wherein the at least one convergent passage tapers as the support shell extends in an axially aft direction.

14. The wall assembly as recited in claim 1, wherein the at least one convergent passage tapers as the support shell extends in an axially forward direction.

15. The wall assembly as recited in claim 1, wherein
the at least one convergent passage includes a forward convergent passage and an aft convergent passage;
the forward convergent passage converges as the contoured region extends from the intermediate circumferential rail towards the forward circumferential rail; and
the aft convergent passage converges as the contoured region extends from the intermediate circumferential rail towards the aft circumferential rail.

16. The wall assembly as recited in claim 1, wherein
the at least one convergent passage includes a forward convergent passage and an aft convergent passage;
the forward convergent passage converges as the contoured region extends from the forward circumferential rail towards the intermediate circumferential rail; and
the aft convergent passage converges as the contoured region extends from the intermediate circumferential rail towards the aft circumferential rail.

17. The wall assembly as recited in claim 1, wherein the support shell is at least one of an outer support shell or an inner support shell.

18. An assembly for a gas turbine engine, comprising:
a gas turbine engine wall structure extending longitudinally along and circumferentially about a centerline, the gas turbine engine wall structure including a support shell and a liner panel mounted to the support shell, and the gas turbine engine wall structure configured with a passage radially between the liner panel and the support shell;
the support shell configured with a contoured region;
the liner panel including a first rail, a second rail and a third rail arranged longitudinally along the centerline between the first rail and the second rail; and
the passage continuously radially tapering as the passage extends longitudinally along the centerline starting at the third rail and ending at the second rail.

19. The assembly of claim 18, wherein
the gas turbine engine wall structure is further configured with a second passage radially between the liner panel and the support shell; and
the second passage continuously radially tapers as the second passage extends longitudinally from the third rail towards the first rail.

20. An assembly for a gas turbine engine, comprising:
a gas turbine engine wall structure extending axially along and circumferentially about an axis, the gas turbine engine wall structure including a support shell and a heat shield mounted to the support shell, and the gas turbine engine wall structure configured with a first passage and a second passage radially between the heat shield and the support shell;
the support shell configured with a contoured region;
the heat shield configured from a plurality of panels, and the heat shield including a first rail, a second rail and a third rail arranged axially along the axis between the first rail and the second rail, wherein the third rail has a third radial height that is greater than a first radial height of the first rail and a second radial height of the second rail;
the first passage radially tapering as the passage extends axially along the axis towards the second rail; and
the second passage radially tapering as the passage extends axially along the axis towards the first rail.

* * * * *